(12) United States Patent
Alvarado et al.

(10) Patent No.: US 11,548,220 B2
(45) Date of Patent: Jan. 10, 2023

(54) ADDITIVE MANUFACTURING SYSTEM AND METHOD (71) Applicant: Continuous Composites Inc., Coeur d'Alene, ID (US)

(72) Inventors: Tyler B. Alvarado, Coeur d'Alene, ID (US); Brock Adam Jahner, Kalispell, MT (US); Andrew John Overby, Coeur d'Alene, ID (US); Jeremiah R. Smith, Coeur d'Alene, ID (US); Ryan C. Stockett, Spokane, WA (US); Nathan Andrew Stranberg, Post Falls, ID (US)

(73) Assignee: Continuous Composites Inc., Coeur d'Alene, ID (US)

( * ) Notice: Subject to any disclaimer, the term of this patent is extended or adjusted under 35 U.S.C. 154(b) by 0 days.

(21) Appl. No.: 17/451,591

(22) Filed: Oct. 20, 2021

(65) Prior Publication Data

US 2022/0118695 A1    Apr. 21, 2022

Related U.S. Application Data (60) Provisional application No. 63/094,512, filed on Oct. 21, 2020.

(51) Int. Cl.
*B29C 64/188* (2017.01)
*B29C 64/209* (2017.01)
*B29C 64/295* (2017.01)
*B29C 64/321* (2017.01)
*B33Y 10/00* (2015.01)
(Continued)

(52) U.S. Cl.
CPC ......... *B29C 64/188* (2017.08); *B29C 64/118* (2017.08); *B29C 64/209* (2017.08); *B29C 64/295* (2017.08); *B29C 64/321* (2017.08); *B33Y 10/00* (2014.12); *B33Y 30/00* (2014.12); *B33Y 40/20* (2020.01); *B33Y 70/10* (2020.01); *B29L 2015/003* (2013.01)

(58) Field of Classification Search
None
See application file for complete search history.

(56) References Cited

U.S. PATENT DOCUMENTS 5,313,325 A    5/1994    Lauf et al.
6,248,269 B1    6/2001    Dietrich et al.
(Continued)

FOREIGN PATENT DOCUMENTS

CN    104496508 B    8/2016
CN    110698211 A  *  1/2020

OTHER PUBLICATIONS

Uwe Scheithauer, An Additive Manufacturing Method for Producing Dense Ceramics, Int. J. Appl. Ceram. Technol., 2015, pp. 27-31, DOI:10.1111/ijac.12306, Fraunhofer Institute for Ceramic Technologies and Systems IKTS, Dresden 01277, Germany.

*Primary Examiner* — Manley L Cummins, IV
(74) *Attorney, Agent, or Firm* — Ryan C. Stockett (57) ABSTRACT

A method is disclosed for additively manufacturing a composite structure. The method may include discharging a composite material from a print head and moving the print head during discharging to fabricate a preform from the composite material. The method may also include densifying the preform with a densifying material, and heating the preform to pyrolize the at least one of the composite material and the densifying material.

14 Claims, 6 Drawing Sheets

(51) Int. Cl.
 *B33Y 30/00* (2015.01)
 *B33Y 40/20* (2020.01)
 *B33Y 70/10* (2020.01)
 *B29C 64/118* (2017.01)
 *B29L 15/00* (2006.01)

(56) References Cited

U.S. PATENT DOCUMENTS

| | | | |
|---|---|---|---|
| 6,521,152 | B1 | 2/2003 | Wood et al. |
| 8,846,147 | B2 | 9/2014 | Eberling-Fux et al. |
| 9,944,526 | B2 * | 4/2018 | Troester ............... B29C 64/106 |
| 2008/0025906 | A1 | 1/2008 | Lin et al. |
| 2015/0360418 | A1 * | 12/2015 | Shah ..................... B33Y 30/00 |
| | | | 264/489 |
| 2016/0332919 | A1 * | 11/2016 | Fryska .................. C04B 35/521 |
| 2017/0001373 | A1 * | 1/2017 | La Forest ............. F16D 69/023 |
| 2017/0072587 | A1 | 3/2017 | Forest et al. |
| 2017/0095985 | A1 | 4/2017 | Engel et al. |
| 2017/0120519 | A1 | 5/2017 | Mark |
| 2018/0162061 | A1 * | 6/2018 | Mark .................... B29C 64/165 |
| 2019/0315054 | A1 | 10/2019 | Alvarado et al. |
| 2020/0114539 | A1 * | 4/2020 | Shim ...................... B33Y 30/00 |
| 2021/0017089 | A1 | 1/2021 | Thrasher et al. |

* cited by examiner

ADDITIVE MANUFACTURING SYSTEM AND METHOD

RELATED APPLICATION

This application is based on and claims the benefit of priority from U.S. Provisional Application No. 63/094,512 that was filed on Oct. 21, 2020, the contents of which are expressly incorporated herein by reference.

TECHNICAL FIELD

The present disclosure relates generally to a system and method for additively manufacturing a composite structure from a composition.

BACKGROUND

A composite is a material made from multiple different constituents that, when put together, have a property enhanced above the same property of the individual constituents. For example, a composite material may be lighter, stronger, stiffer, harder, tougher, more heat resistant, etc. than the constituent materials used to make the composite material. One example application of a composite is in high-temperature environments, where weight, strength and durability are important considerations. This can include aerospace applications, such as components of a flight or space vehicle engine, heat shields, and rocket nozzles; nuclear applications, such as fuel rod insulators; and other applications.

Multiple types of composites may be used in high-temperature environments. These types include, among others, carbon bonded fiber composites (CBFCs), such as carbon-bonded-carbon and carbon-bonded-ceramic composites; and ceramic matrix composites (CMCs), such as ceramic-bonded-carbon and ceramic-bonded-ceramic composites. While these types of composites may provide many benefits, their fabrication can be difficult, time consuming and expensive. Accordingly, their uses are currently limited.

For example, a typical fabrication process for making a CBFC or a CMC component includes first coating fibers (e.g., carbon or ceramic fibers) with a material that promotes anisotropic performance of the fibers. Coated fibers are then laid by hand into a mold or wrapped around a mandrel, both having a nondescript shape and a size that is significantly greater than an intended final size of the desired component. The fibers are thereafter saturated with a resin, and the mold, fibers and resin are placed into an oven and heated to a temperature at which the resin pyrolizes into carbon or a ceramic. The pyrolyzing creates voids within the resulting structure that must then be filled with more resin. The mold is again placed into the oven and heated, and the process is repeated until a porosity of the resulting structure is sufficiently low for the intended application. At this point in time, a generically shaped block of composite material is produced, which must then be subtractively machined to a desired net shape. Because of a hardness of the composite material (particularly CMCs), the machining can be difficult.

While CBFCs and CMCs may perform well in certain applications, the processes to fabricate them are labor, time and material exhaustive. This makes these composite components expensive and limits their applications. The disclosed additive manufacturing system and method are uniquely configured to address these and other issues of the prior art

SUMMARY

In one aspect, the present disclosure is directed to a system for additively manufacturing a composite structure. The system may include a support, and a discharge head connected to and moved by the support. The discharge head may be configured to discharge a composite material. The system may also include a cure enhancer configured to at least partially cure the composite material at discharge, a supply configured to advance a densifying material toward the composite material, and a heater configured to pyrolize the densifying material.

In another aspect, the present disclosure is directed to a method for additively manufacturing a composite structure. The method may include discharging a composite material from a print head and moving the print head during discharging to fabricate a preform from the composite material. The method may also include densifying the preform with a densifying material, and heating the preform to pyrolize the at least one of the composite material and the densifying material.

DETAILED DESCRIPTION

Figure 1:
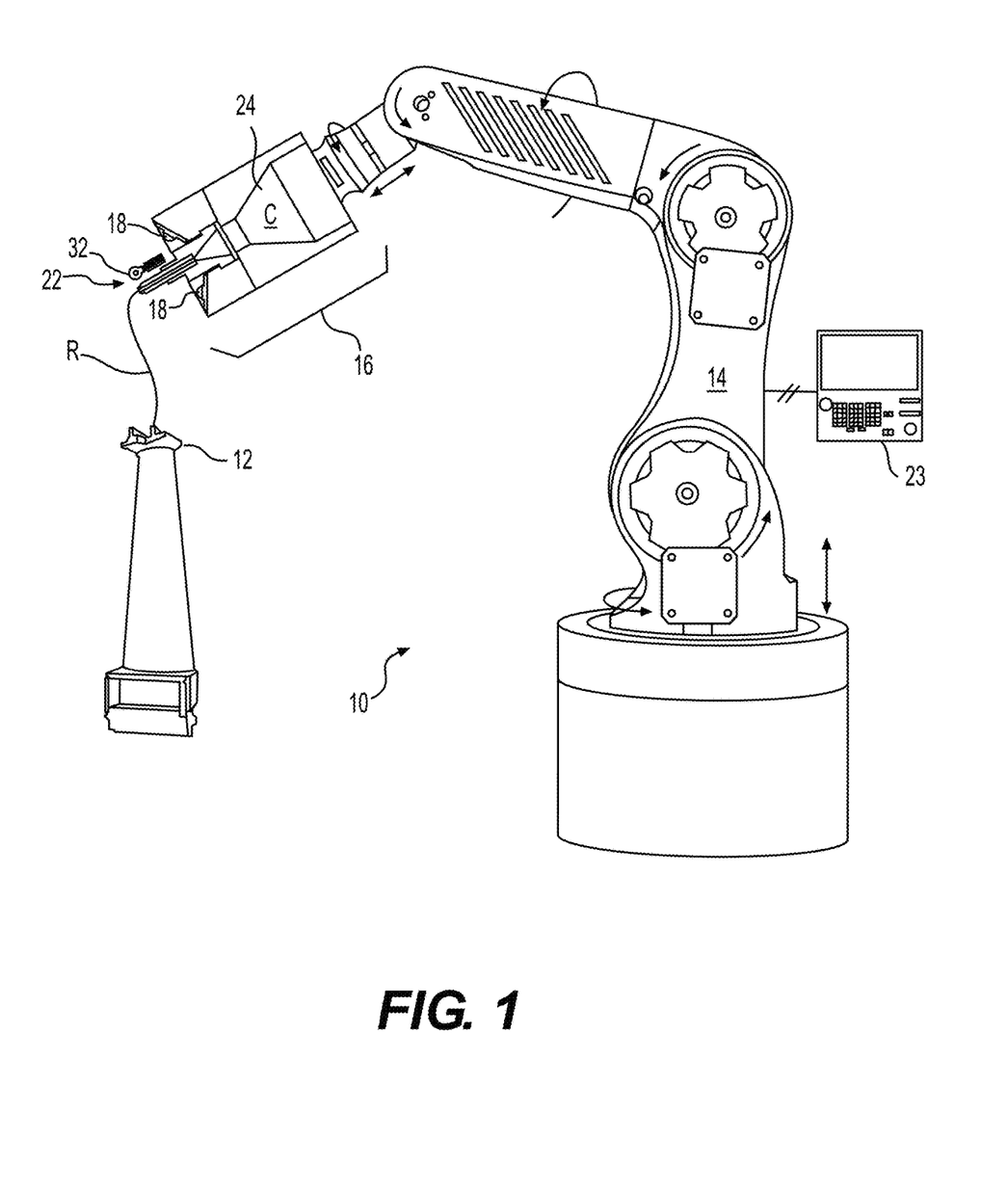
FIG. 1 is a diagrammatic illustration of an exemplary disclosed manufacturing system.

FIG. 1 illustrates an exemplary additive manufacturing system ("system") 10, which may be used to manufacture a composite structure (e.g., a turbine blade, a rocket nozzle, a heat shield, a nuclear fuel rod insulator, etc.) 12 having a desired net or near-net shape (e.g., without substantial subtractive machining being required). System 10 may include a support 14 and one or more deposition heads ("head") 16. Head(s) 16 may be coupled to and moveable by support 14. In the disclosed embodiment of FIG. 1, support 14 is a robotic arm capable of moving head(s) 16 in multiple directions during fabrication of structure 12. Support 14 may alternatively embody a gantry (e.g., an overhead bridge or single-post gantry) or a hybrid gantry/arm also capable of moving head(s) 16 in multiple directions during fabrication of structure 12. Although support 14 is shown as being capable of movements along or about 6-axes, it is contemplated that support 14 may be capable of moving head(s) 16 in a different manner (e.g., along or about a greater or lesser number of axes). In some embodiments, a drive may mechanically couple head(s) 16 to support 14 and include components that cooperate to move portions of and/or supply power or materials to head 16.

Each head 16 may be configured to receive or otherwise contain a resin composition ("composition," shown as C in the figures). The composition may include any type of liquid (e.g., a suspension or a solution) that is curable to a solid or semi-solid state (e.g., curable sufficient to hold a green shape of structure 12 during subsequent processing) and/or pyrolyzable into carbon or a ceramic via application of energy (e.g., light, radiation, heat, pressure, chemical catalyst, vibration, magnetic field, etc.). Exemplary compositions include thermosets (e.g., phenolics, furans, (meth)acrylates, epoxies, etc.), pitches, ceramic precursors (e.g., SiC, $Si_3N_4$, BN, AlN, SiOC, SiCN, BCN, etc.), and others.

In one embodiment, the composition inside head 16 may be pressurized, for example by an external device (e.g., by an extruder, a pump, etc.—not shown) that is fluidly connected to head 16 via a corresponding conduit (not shown). In another embodiment, however, the pressure may be generated completely inside of head 16 by a similar type of device. In yet other embodiments, the composition may be gravity-fed into and/or through head 16. For example, the composition may be fed into head 16, and pushed or pulled out of head 16 along with one or more reinforcements (shown as R in FIG. 1). In some instances, the composition inside head 16 may need to be kept cool and/or dark to inhibit premature curing or otherwise obtain a desired rate of curing after discharge. In other instances, the composition may need to be kept warm and/or illuminated for similar reasons. In either and other situations, head 16 may be specially configured (e.g., insulated, temperature-controlled, shielded, etc.) to provide for these needs.

In some applications, one or more additives may be mixed into the composition at a location upstream of and/or inside of head 16. These additives may be selected to enhance a property of structure 12. For example, the additives may include constituents (e.g., B, Zr, etc.) that increase a thermal operational range of structure 12, constituents (e.g., Fe, Co, Ni, etc.) that increase a magnetic property of structure 12, constituents (e.g., ferrous materials) that enhance the action of pyrolysis, and/or constituents (e.g., Cu, Pd, Pt, etc.) that increase a catalytic property of structure 12.

The composition (i.e., with or without any additives) may be used to coat any number of reinforcements that enhance a mechanical property of structure 12, including continuous reinforcements and discontinuous reinforcements. For the purposes of this disclosure, continuous reinforcements may be considered to have an aspect ratio (V) defined as a length (L) divided by a diameter (d) (e.g., $V=L/d$) that is greater than 10, 100, 1000, 100,000, 1,000,000 or even larger. Discontinuous reinforcements may include reinforcements having an aspect ratio less than that of continuous reinforcements.

The reinforcements may be supplied in the form of powder, particles, chopped fibers, unchopped fibers, tows, braids, rovings, fabrics, knits, mats, socks, sheets, tubes, etc. of material that, together with the composition, make up a composite portion (e.g., a wall) of structure 12. The reinforcements may be stored within or otherwise passed through head 16 (e.g., fed from one or more spools or hoppers—not shown). When multiple reinforcements are simultaneously used, the reinforcements may be of the same material and have the same sizing and cross-sectional dimension and shape, or a different material with different sizing and/or cross-sectional dimension and shape. The sizing may include, for example, treatment of the reinforcement with plasma, treatment with an acid (e.g., nitric acid), or otherwise surface-functionalized with an agent (e.g., a dialdehyde, an epoxy, a vinyl, and/or another functional group) to enhance adhesion of the composition to the reinforcement. It should be noted that the term "reinforcement" is meant to encompass both structural and non-structural (e.g., functional) types of materials that are at least partially encased in the composition discharging from head 16.

The reinforcements may be opaque (e.g., partially or completely opaque) to a cure energy, transparent (e.g., partially or completely transparent) to the cure energy, and/or a mixture of opaque and transparent materials. The reinforcement materials may include, for example, carbon fibers, graphite fibers, graphene fibers, resorcinol-formaldehyde blends, asbestos fibers, Kevlar fibers, polybenzimidazole fibers, polysulforamide fibers, glass fibers, poly(phenylene oxide) fibers, vegetable fibers, wood fibers, mineral fibers, plastic fibers, metallic wires, optical tubes, aramid fibers, polyacrylonitrile, rayon, petroleum pitch, natural pitch, resoles, carbon nanotubes, carbon soot, creosote, SiC, boron, WC, butyl rubber, boron nitride, fumed silica, nanoclay, silicon carbide, boron nitride, zirconium oxide, titanium dioxide, chalk, calcium sulfate, barium sulfate, calcium carbonate, silicates (e.g., talc, mica or kaolin, silicas, aluminum hydroxide, magnesium hydroxide, etc.), organic reinforcements (e.g., polymer powders, polymer fibers, etc.), and mixtures thereof.

In one example, the composition may be a carbon precursor (e.g., pyrolyzable to carbon) and used to coat carbon reinforcements, a mixture of carbon and non-carbon reinforcements, ceramic reinforcements, and/or a mixture of ceramic and non-ceramic reinforcements. In another example, the composition may be a ceramic precursor and used to coat carbon reinforcements, a mixture of carbon and non-carbon reinforcements, ceramic reinforcements, and/or a mixture of ceramic and non-ceramic reinforcements. As will be explained in more detail below, non-carbon and/or non-ceramic reinforcements may be selectively used in conjunction with carbon and/or ceramic reinforcements for purposes of creating conduits that enhance saturation of the carbon and/or ceramic reinforcements with the composition.

The reinforcements may be exposed to (e.g., at least partially coated and/or internally wetted with) the composition while the reinforcements are inside head 16, while the reinforcements are passing into head 16, and/or while the reinforcements are discharging from head 16. The composition, dry (e.g., unimpregnated) reinforcements, and/or reinforcements that are already exposed to the composition (pre-impregnated reinforcements) may be transported into head 16 in any manner apparent to one skilled in the art. In some embodiments, discontinuous reinforcements (e.g., powder, nano-particles or tubes, chopped fibers, etc.) may be mixed with the composition and/or additives before and/or after the composition coats continuous reinforcements.

One or more cure enhancers (e.g., a light source, a radiation source, an ultrasonic emitter, a microwave generator, a magnetic field generator, a heater, a catalyst dispenser, etc.) 18 may be mounted proximate (e.g., within, on, and/or adjacent) head 16 and configured to affect (e.g., initiate, enhance, complete, or otherwise facilitate) curing of the composition as it is discharged with the reinforcement(s) from head 16. Each cure enhancer 18 may be independently and/or cooperatively controlled to selectively expose one or more portions of the discharging material to cure energy (e.g., electromagnetic radiation, vibrations, heat, a chemical catalyst, etc.). The energy may trigger a reaction to occur within the composition, increase a rate of the reaction, sinter the composition, pyrolyze the composition, harden the composition, stiffen the composition, or otherwise cause the composition to partially or fully cure and/or char as it discharges from head 16. The amount of energy produced by cure enhancer 18 may be sufficient to at least partially cure the composition before structure 12 axially grows more than a predetermined length away from head 16. In one embodiment, structure 12 is cured sufficient to hold its shape before the axial growth length becomes equal to an external diameter of the composition-coated reinforcement.

The composition and/or reinforcement may be discharged from head 16 via at least two different modes of operation. In a first mode of operation, the composition and/or reinforcement are extruded (e.g., pushed under pressure and/or mechanical force) from head 16, as head 16 is moved by support 14 to create features of structure 12. In a second mode of operation, at least the reinforcement (e.g., a continuous reinforcement) is pulled from head 16, such that a tensile stress is created in the reinforcement during discharge. In this mode of operation, the composition may cling to the reinforcement and thereby also be pulled from head 16 along with the reinforcement. Additionally or alternatively, the composition may be discharged from head 16 under pressure along with the pulled reinforcement. In the second mode of operation, where the composition is being pulled from head 16 with the reinforcement, the resulting tension in the reinforcement may increase a strength of structure 12 (e.g., by aligning the reinforcements, inhibiting buckling, etc.) after curing of the composition, while also allowing for a greater length of unsupported structure 12 to have a straighter trajectory. That is, the tension in the reinforcement may act against the force of gravity (e.g., directly and/or indirectly by creating moments that oppose gravity) to provide support for structure 12. In some embodiments, the tension may also help impregnate the reinforcement with composition (e.g., in pressure-based impregnation applications).

The reinforcement may be pulled from head 16 as a result of head 16 being moved by support 14 away from an anchor (e.g., a print bed, a feature of structure 12, etc.). In particular, at the start of structure formation, a length of composition-impregnated reinforcement may be pulled and/or pushed from head 16, deposited onto the anchor, and cured, such that the discharged material adheres or is otherwise coupled to the anchor. Thereafter, head 16 may be moved away from the anchor, and the relative movement may cause the reinforcement to be pulled from head 16. It should be noted that the movement of reinforcement through head 16 could be assisted via internal feed mechanisms (not shown), if desired. However, the discharge rate of reinforcement from head 16 may primarily be the result of relative movement between head 16 and the anchor, such that tension is created within the reinforcement. It should be noted that the anchor could be moved away from head 16 instead of or in addition to head 16 being moved away from the anchor.

As can be seen in FIG. 1, head 16 may include, among other things, an outlet 22 and a composition reservoir 24 located upstream of outlet 22. In this example, outlet 22 is a single-channel nozzle configured to discharge composite material having a generally circular, tubular, or rectangular cross-section. The configuration of head 16 may, however, allow outlet 22 to be swapped out for another outlet (not shown) that discharges composite material having a different shape (e.g., a flat or sheet-like cross-section, a multi-track cross-section, etc.). Fibers, tubes, and/or other reinforcements may pass through composition reservoir 24 and be wetted (e.g., at least partially coated, internally wetted, and/or fully saturated) with composition prior to discharge. Any type of wetting mechanism(s) known in the art (e.g., a bath—shown, an injector, a pressure-based applicator, etc.) may be associated with composition reservoir 24.

In one example, a compactor 32 trails outlet 22 (e.g., relative to a normal travel direction of head 16 during material discharge) and moves (e.g., rolls and/or slides) over the material discharging from outlet 22 to compact the material. It is contemplated that either the nozzle of outlet 22 or compactor 32 may function as a tool center point (TCP) of head 16 to affix the composition-wetted reinforcement(s) at a desired location prior to and/or during curing when exposed to energy by cure enhancer(s) 18. It is also contemplated that the nozzle and/or compactor 32 may be omitted, in some embodiments. Finally, it is contemplated that the TCP of head 16 may not necessarily be associated with the nozzle or compactor 32 and instead be a location of cure energy exposure that is separate from these locations. The TCP may also switch locations in some applications.

One or more controllers 23 may be provided and communicatively coupled with support 14 and one or more components of head 16. Each controller 23 may embody a single processor or multiple processors that are programmed to control an operation of system 10. Controller 23 may further include or be associated with a memory for storing data such as, for example, design limits, performance characteristics, operational instructions, tool paths, and corresponding parameters of components of system 10. Various other known circuits may be associated with controller 23, including power supply circuitry, signal-conditioning circuitry, solenoid driver circuitry, communication circuitry, and other appropriate circuitry. Moreover, controller 23 may be capable of communicating with other components of system 10 via wired and/or wireless transmission.

One or more maps may be stored in the memory of or otherwise be accessible by controller 23 and used during fabrication of structure 12. Each of these maps may include a collection of data in the form of lookup tables, graphs, and/or equations. In the disclosed embodiment, the maps may be used by controller 23 to determine movements of head 16 required to produce desired geometry (e.g., size, shape, material composition, performance parameters, and/or contour) of structure 12, and to regulate operation of cure enhancer(s) 18 and/or other related components in coordination with the movements.

Figure 2:
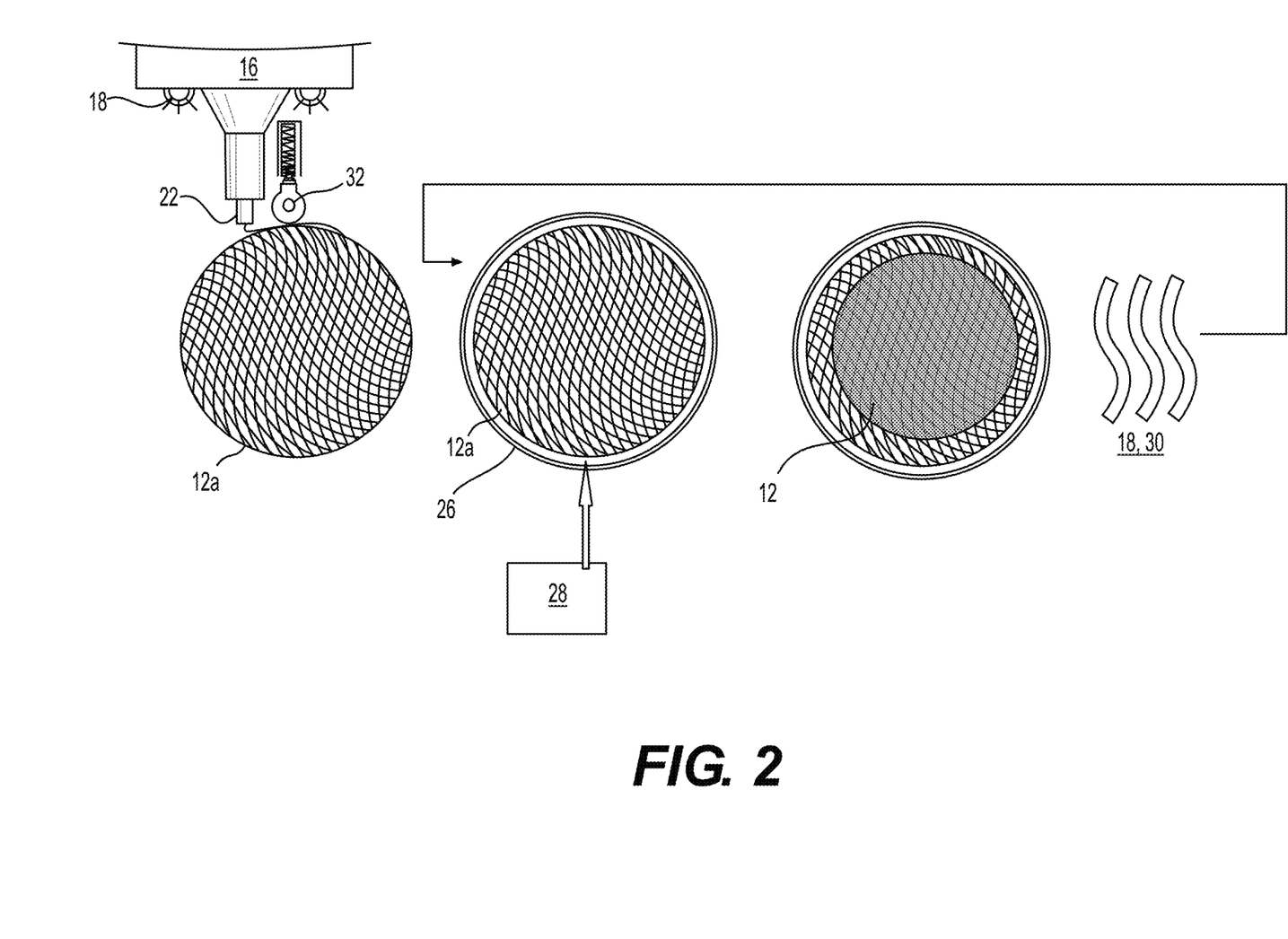
FIG. 2 is a schematic illustration of a fabrication process that can be completed by the manufacturing system of FIG. 1.

In one embodiment, structure 12 may fabricated by system 10 as a CBFC or a CMC. As shown in FIG. 2, this process may involve multiple steps, although fewer steps than the traditional hand-layup processes described above. In a first step (shown far left image of FIG. 2), composite material may be discharged from head 16 to produce a three-dimensional preform 12a (e.g., a preform of carbon or ceramic fibers at least partially coated in and/or internal wetted with a ceramic or carbon precursor composition). Preform 12a may be fabricated within a mold 26, on a build platform, and/or in free-space (e.g., without a mold or platform) to have a desired net or near-net shape of structure 12. For example, the composition-wetted continuous reinforcement may be adhered to a surface of mold 26, to a surface of the build platform, or to an existing anchor placed or prefabricated at any desired location and orientation. Thereafter, head 16 may be moved by support 14 (referring to FIG. 1) relative to the surface or anchor, thereby causing the composite material to be pulled from head 16 and placed along a desired contour. As the material discharges from head 16, the composition may be at least partially cured (e.g., stiffened sufficient to hold its shape, location and/or orientation) by exposure to energy from cure enhancer(s) 18. In some embodiments, the composition (e.g., a thixotropic resin) may become thick enough after discharge to hold its shape without needing to be cured by enhancer(s) 18. In these embodiments, the initial step of curing may be omitted, if desired.

After preform 12a has been fabricated, preform 12a may selectively be densified. In the embodiment where preform 12a is fabricated inside of mold 26, a densifying material (e.g., a carbon or ceramic precursor) may be introduced into mold 26 as a liquid and/or a gas (e.g., by a corresponding supply 28—shown in the middle image of FIG. 2). The densifying material may be the same as the composition originally used to fabricate preform 12a or a different composition, as desired. The densifying material may adhere to the previously discharged material and fill voids therein and/or therebetween. When preform 12a is fabricated on a build platform or in free-space, preform 12a may be densified in the same location or transferred into mold 26 or into a specially prepared densification chamber (not shown) prior to densification. Heat and/or pressure may be utilized to enhance infiltration of the densifying material into the voids and spaces of preform 12a.

It is contemplated that a first degree of densification may be performed in situ during fabrication of preform 12a, if desired. For example, supply 28 may be operatively connected to head 16 at a trailing location (e.g., downstream of cure enhancer(s) 18 and/or compactor 32), to advance the densification material toward the portion of preform 12a being discharged from head 16 and cured by cure enhancer (s) 18. As will be explained in more detail below, this may eliminate one or more steps in the fabrication of structure 12. In this embodiment, it may be possible for the composition first applied to the reinforcement inside of head 16 to only be a minimum amount required to hold a shape of the reinforcement during the immediately ensuing densification step.

Figure 8:
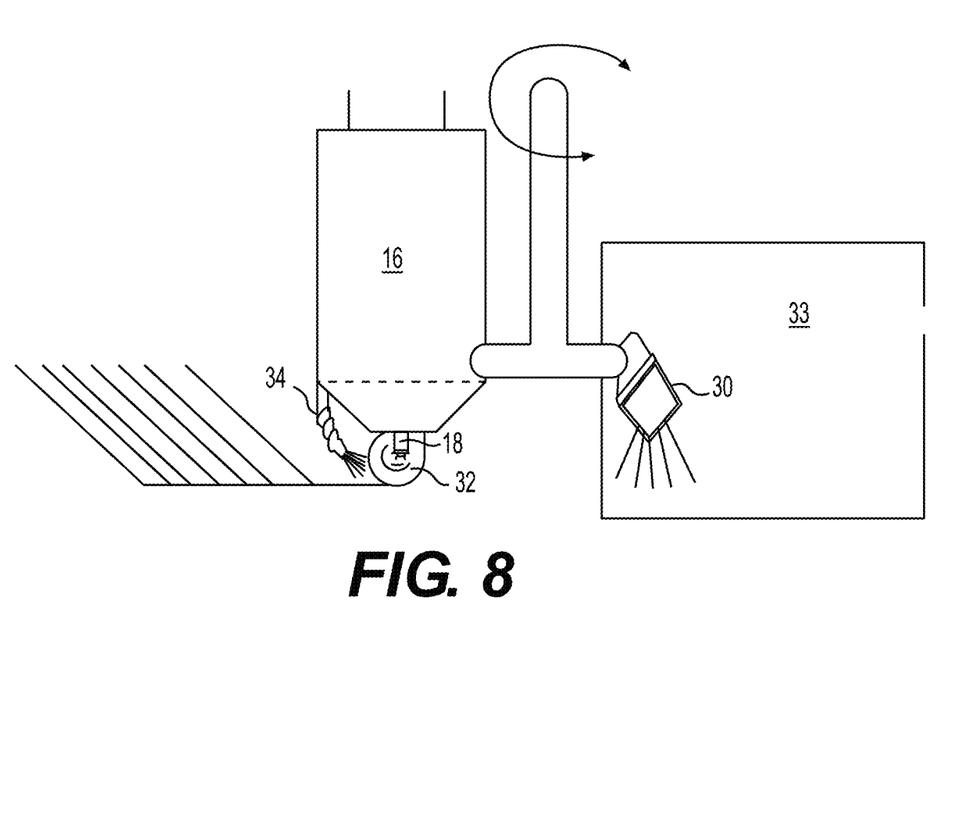
FIGS. 8 and 9 are diagrammatic illustrations of portions of the manufacturing system of FIG. 1.
Figure 9:
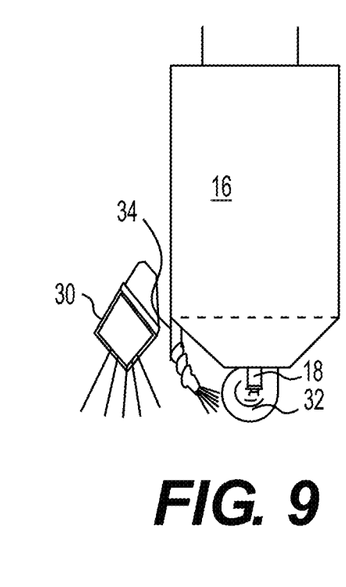

After the application of densifying material, preform 12a may be pyrolized (shown in the right image of FIG. 2). That is, preform 12a and the added densifying material (or preform 12a only with the in-head applied composition) may be exposed to elevated temperatures (e.g., to temperatures of about 400-3000° C., such as 400-500° C. or 500-1500° C.) that causes the densifying material and/or the in-head applied composition to carbonize into char. In one example, the elevated temperatures are generated by a dedicated heating device 30. In one application, heating device 30 is a component located offboard head 16 (e.g., in a dedicated chamber—see FIG. 8). In another application, heating device 30 is operatively connected to head 16 (see FIG. 9) at a location downstream of supply 28 (referring to FIG. 2) and configured to pyrolize the densifying material in situ during fabrication of preform 12a. In an alternative embodiment, one or more of cure enhancer(s) 18 may function to both cure and pyrolize the densifying material in place of or in addition to heating device 30, if desired. That is, the process of curing the composition to hold the shape of preform 12a could additionally at least partially pyrolize the composition.

Without wishing to be bound by any theory, carbonization due to pyrolysis may include polymerization and growth of the composition, which results in desirable carbon enrichment of preform 12a. It should be noted that pyrolization may be enhanced when performed within a controlled environment (e.g., in the absence of oxygen). Accordingly, in the above embodiments, where heating device 30 is located offboard head 16 and inside of chamber 33, chamber 33 may be evacuated of oxygen and/or filled with an inert gas (e.g., argon, helium, nitrogen, etc.). Alternatively, when heating device 30 is mounted to head 16, a flow of the inert gas from an onboard source 34 may be directed over the discharging material (see FIGS. 8 and 9).

When heating device 30 is located offboard head 16, pyrolization may occur only when all of the structure of preform 12a has been completed or periodically as select portions (e.g., each layer) of preform 12a have been completed. In either of these scenarios, fabrication of preform 12a may be performed inside of chamber 33 or outside. When fabrication is performed outside of chamber 33, preform 12a may selectively be transferred into chamber 33 after each select portion has been discharged and cured, and then transferred back out of chamber 33 after each pyrolization event.

It is contemplated that pyrolization may be completed before or after a first application of the densifying material. That is, heating device 30 and/or cure enhancer(s) 18 may be selectively activated by controller 23 to at least partially carbonize or burn away the composition holding the structure of preform 12a together, prior to the first application of the densifying material. In some embodiments, this may leave behind less than 40% (e.g., less than 20%) of the original composition (e.g., by converting the composition to char). This may help reduce a number of steps required in the process of fabricating structure 12, particularly when the composition holding preform 12a together is different from the densifying material.

As preform 12a is heated (e.g., with or without the densifying material), the associated composition and/or densifying material may shrink, crack, or otherwise become porous. In order to provide a desired density to structure 12, multiple cycles of material application and pyrolyzing may be required. Any number of these cycles may be implemented.

Figure 3:
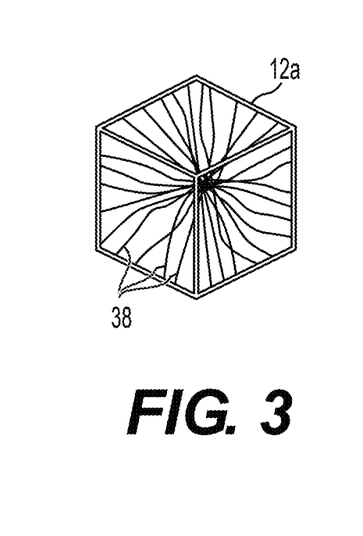
FIGS. 3, 4, and 5 are diagrammatic illustrations of a structure fabricated via the manufacturing system of FIG. 1 and the process of FIG. 2.

Although densification may help to reduce porosity within preform 12a, this may only be true when access to corresponding pores is available. Controller 23 may be programmed to regulate the discharge of material from head 16 in a way that mechanically enhances densification of preform 12a by providing access to internal pores. For example, as shown in FIG. 3, the reinforcements discharging from head 16 may purposely be steered within a given voxel of structure 12 to create conduits 38 for the densification material. That is, it has been shown that cracks generated during the pyrolyzing step(s) described above may correspond (e.g., align) with trajectories of the continuous reinforcements making up preform 12a. Accordingly, the continuous reinforcements may be selectively steered (e.g., via regulated motion of head 16 produced by support 14 during material discharge) to produce cracks that function as conduits 38 and deliver subsequently applied densifying material to desired locations within preform 12a. In the disclosed embodiment, the continuous reinforcements are arranged within the given voxel to extend from near or at an outer surface of the voxel radially inward toward the desired locations (e.g., inward toward a general center of a feature of structure 12).

Figure 4:
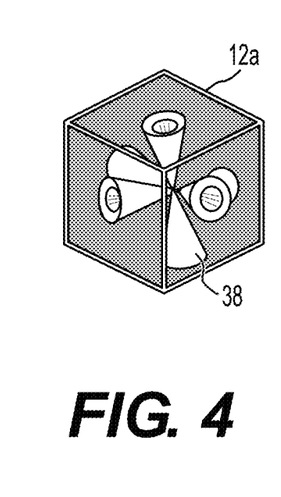

In another example illustrated in FIG. 4, conduits 38 may be directly fabricated by system 10 (e.g., as opposed to requiring the heat of pyrolysis for formation). In the disclosed embodiment of FIG. 4, conduits 38 may be intentionally formed cavities or recesses having a generally conical shape, with a larger opening at the outer surface of a given voxel and a smaller opening at a general center of the voxel. This may allow successive cycles of densification/ pyrolyzing to be performed without blocking access to voids at a center of a given voxel of preform 12a. Conduits 38 may incrementally reduce in a radial direction during successive densification steps and eventually be completely filled by completion of the process.

Figure 5:
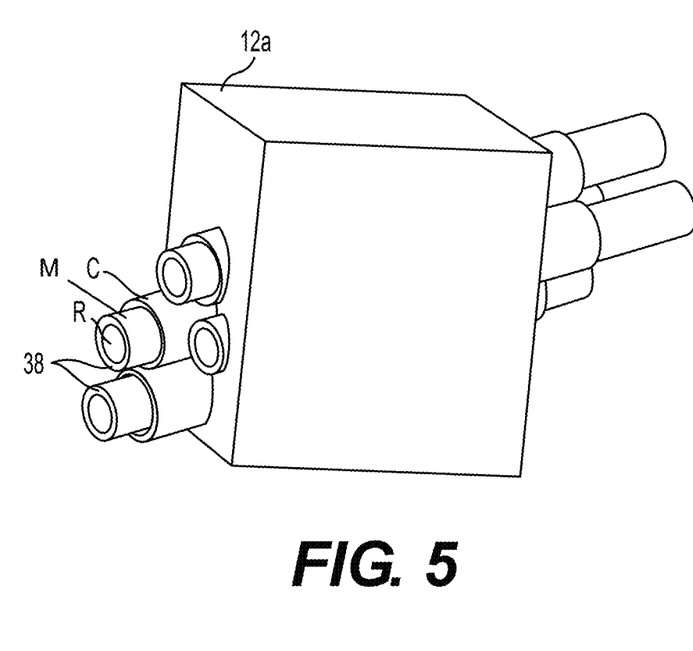

In yet another example illustrated in FIG. 5, one or more continuous reinforcements may be coated with a material (e.g., prior to coating with the composition) that is intended to burn away completely or shrink significantly during pyrolization. This may allow annular conduits 38 to form around the continuous reinforcements and provide access to the voids at the center of a given voxel. Alternatively, the composition itself used to fabricate preform 12a (i.e., as opposed to only the coating) may be selected to burn away completely or shrink significantly after a first coating of the densifying material and during the subsequent pyrolyzing step.

In another embodiment (not shown), multiple different types of continuous reinforcements may be discharged together to pass through a given voxel of preform 12a in a desired distribution. In this embodiment, one of the continuous reinforcement types is selected to burn away completely or shrink significantly during pyrolization and thereby create conduits 38, while the other type of reinforcement is intended to remain and impart mechanical properties to structure 12.

Figure 6:
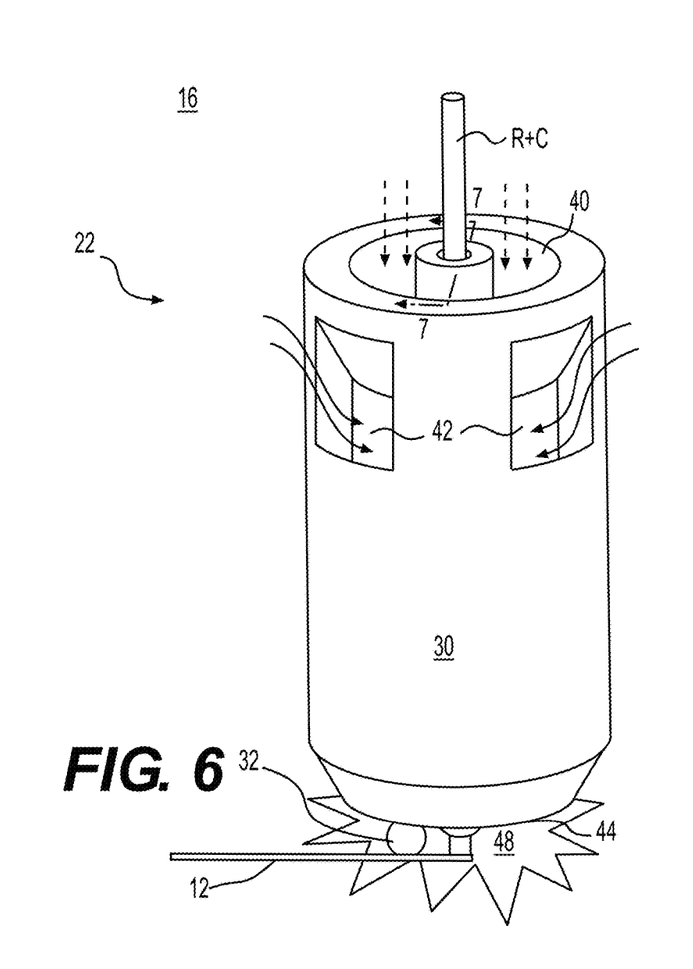
FIGS. 6 and 7 are isometric and cross-sectional illustrations of a portion of the manufacturing system of FIG. 1.
Figure 7:
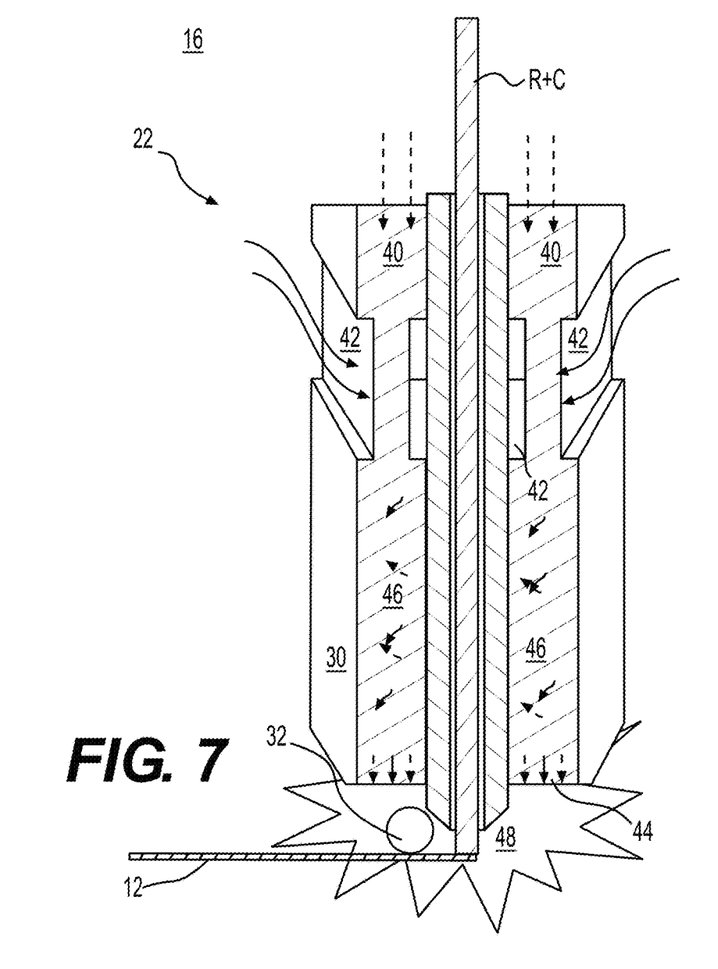

FIGS. 6 and 7 illustrate an exemplary embodiment of head 16 having an integrated heating device 30 configured to pyrolize the composition in situ as the composite material discharges through outlet 22. As can be seen in FIGS. 6 and 7, heating device 30 may embody a hollow cylindrical sleeve configured to at least partially receive and annularly surround the nozzle of outlet 22. In some embodiments, a tip of the nozzle may protrude a distance past a distal end of the sleeve. An axial inlet 40 of the sleeve may be configured to receive a flammable gas (e.g., propane, acetylene, etc.), and one or more radial inlets 42 may be configured to receive oxygen. Inlet(s) 42 may be axially located between inlet 40 and an outlet 44 of the sleeve. A flow of the flammable gas from inlet 40 to inlets 42 may function to thermally isolate at least a portion of the nozzle and other upstream components from heat generated by combustion of the gas at outlet 44. An annular combustion chamber 46 may be formed between inlets 42 and outlet 44, allowing the flammable gas and oxygen to mix and combust prior to exhaustion of byproducts and heat from outlet 44. In this way, composite material discharging from the nozzle of outlet 22 may be exposed to the heat within a shielded (i.e., oxygen-free) zone 48. It is contemplated that the flammable gas and oxygen may chemically react enough to produce zone 48, regardless of where or when combustion occurs. Zone 48 may facilitate pyrolization of the composition.

Once a desired density within structure 12 has been achieved, the process of fabrication may be completed. That is, structure 12 may have a desired shape and size, without machining being required. In some instances, however, structure 12 may be intentionally oversized and light machining may be helpful to precisely achieve the desired shape and/or size within a required tolerance.

Figure 10:
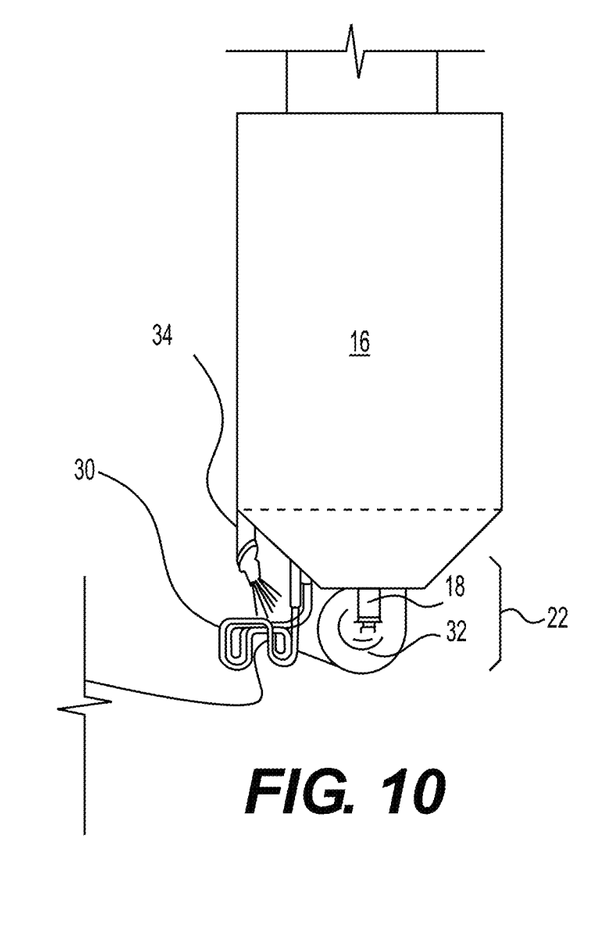
FIG. 10 is a diagrammatic illustration of another portion of the manufacturing system of FIG. 1.

Another exemplary embodiment of head 16 having an integrated onboard heating device 30 is illustrated in FIG. 10. In this embodiment, heating device 30 is an induction heater having a general U-shape that is connected to trail behind outlet 22. At this location, heating device 30 may be configured to generate an alternating magnetic field in response to an electric current passing through one or more associated coils. The magnetic field passes through the composite material discharging from outlet 22, interacting with particles (e.g., the particles of ferrous material discussed above) added to the composition wetting the reinforcement(s). The interaction may cause a voltage to be induced within the particles and a corresponding flow of electrons. As the current flows through the particles, there will be some resistance to the movement that is expressed as heat. The heat may be sufficient to pyrolize the composition within a zone around each particle. It should be noted that, while a U-shaped heating device 30 is illustrated, other shapes of heating coils could also or alternatively be affixed to head 16 at a trailing location. In addition or alternatively, one or more offboard induction-type heating devices 30 could be utilized to induce the current flow within the composition particles, if desired.

Figure 11:
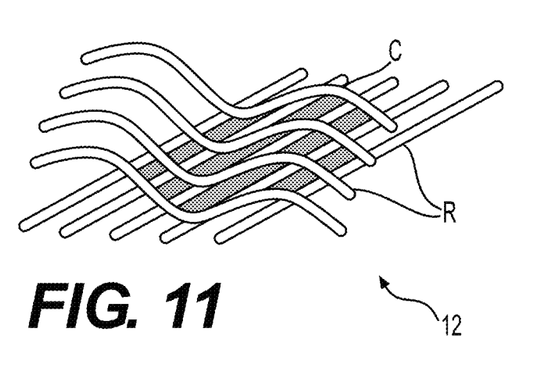
FIGS. 11 and 12 are diagrammatic illustrations of additional structures that can be fabricated via the manufacturing system of FIG. 1.
Figure 12:
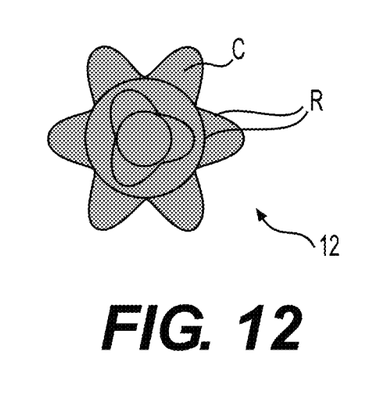

It has been found that during curing and/or pyrolysis of the composition, the composition may be caused to shrink. If unaccounted for, this shrinking could result in delamination between adjacent reinforcements and/or overlapping layers of reinforcements. Controller 23 may be programmed to affect the way in which the reinforcements are discharged and arranged to reduce a likelihood of delamination during curing and/or pyrolysis. FIGS. 11 and 12 illustrate example arrangements of the reinforcements.

As shown in FIGS. 11 and 12, some (e.g., every other overlapping reinforcement or layer in a planar buildup, every other adjacent reinforcement or layer in an annular buildup, etc.) or all reinforcements within structure 12 may be selectively discharged to have an undulating (e.g., sinusoidal) trajectory. The undulations may lie within a single plane or three-dimensional space, as desired. This trajectory may provide an amount of flexibility to the reinforcements and/or layers, allowing them to be pulled and/or stretched during shrinking of the composition, without the reinforcements or layers delaminating significantly from each other. It is contemplated that parameters of the undulating trajectories (e.g., a frequency, an amplitude, etc.) may be adjusted between layers (e.g., as a function of stack height, radius, etc.) to account for a changing amount of delamination risk expected at the given layers.

INDUSTRIAL APPLICABILITY

The disclosed system may be used via the disclosed methods to manufacture composite structures having any desired cross-sectional shape, length, density, strength, or other desired performance parameter. The composite structures may include any number of different reinforcements of the same or different types, diameters, shapes, configurations, and consists, and any number and types of different compositions. The disclosed system may be particularly applicable to fabrication of CBFCs, CMCs, and other high-temperature composite components. An operational overview of system 10 will now be described.

At a start of a manufacturing event, information regarding a desired structure 12 to be fabricated may be loaded into system 10 (e.g., into controller 23 that is responsible for regulating operation of support 14, head 16, cure enhancer(s) 18, supply 28, and/or heating device 30). This information may include, among other things, a size (e.g., diameter, wall thickness, length, etc.), a contour (e.g., a trajectory), surface features (e.g., ridge size, location, thickness, length; flange size, location, thickness, length; etc.), connection geometry (e.g., locations and sizes of couplings, tees, splices, etc.), location-specific composition stipulations, location-specific reinforcement stipulations, desired cure rates, cure locations, cure parameters, desired pyrolization rates, pyrolization locations, pyrolization parameters, additive specifications, etc. It should be noted that this information may alternatively or additionally be loaded into system 10 at different times, periodically, and/or continuously during the manufacturing event, if desired.

Based on the component information, one or more different (e.g., different sizes, shapes, numbers, and/or types of) reinforcements, compositions, additives, etc. may be selectively installed within system 10, supplied into reservoir 24 of head 16, and/or directed into supply 28. For example, a tow of carbon and/or ceramic fiber may be threaded through outlet 22 of head 16, and a carbon and/or ceramic precursor composition may fill composition reservoir 24 and/or supply 28. Controller 23 may then selectively activate a wetting mechanism inside of reservoir 24, an onboard and/or off-board embodiment of supply 28, cure enhancer(s) 18, support 14, and/or an onboard and/or offboard embodiment of heating device 30, such that the continuous reinforcement passing through head 16 is appropriately coated and/or internally wetted with the composition and/or a different densifying material, pulled from head 16, cured to form a shape of preform 12a, densified, and/or pyrolized.

As discussed above, certain reinforcements may be opaque, transparent or semi-transparent to the energy from cure enhancer(s) 18. Mixtures of more than one reinforcement are within the scope of this disclosure, including embodiments having some opaque reinforcements, some transparent reinforcements and/or some partially-transparent reinforcements.

The disclosed system may be used to fabricate composite structures that can be used in high-temperature applications. The system may fabricate the structures to a net or near-net shape in a localized manner, thereby reducing consumption of expensive resources and time.

It will be apparent to those skilled in the art that various modifications and variations can be made to the disclosed system and method. Other embodiments will be apparent to those skilled in the art from consideration of the specification and practice of the disclosed system and method. For example, although a gas-powered heater and an induction heater have been disclosed, it is contemplated that other types of heaters (e.g., lasers, plasma generators, conductive elements, etc.) could alternatively be used to locally heat and thereby pyrolize or graphitize the preform and/or composition subsequently deposited (e.g., sprayed as a liquid, advanced as a gas, etc.) onto the preform. It is further contemplated that, although perhaps less efficient, separate heads may be used to separately fabricate the preform and thereafter locally densify/pyrolize the preform within a locally shielded environment. It is intended that the specification and examples be considered as exemplary only, with a true scope being indicated by the following claims and their equivalents.

What is claimed is:

1. A method of additively manufacturing a composite structure, comprising:
    discharging a composite material from a print head;
    moving the print head during discharging to fabricate a preform from the composite material,
    curing the preform with a cure enhancer attached to the print head;
    densifying the preform with a densifying material;
    heating the preform to pyrolize at least one of the composite material and the densifying material; and
    wherein:
        the composite material including ferrous particles at least partially wetted with a composition; and
        heating the preform includes trailing heater attached to the print head to heat the and pyrolize the composition in the preform.

2. A method of additively manufacturing a composite structure, comprising:
    discharging a composite material from a print head;
    moving the print head during discharging to fabricate a preform from the composite material;
    densifying the preform with a densifying material;
    heating the preform to pyrolize at least one of the composite material and the densifying material;
    wherein:
        discharging the composite material includes steering a plurality of reinforcements in the composite material to form a conical conduit through a given voxel of the preform; and
        densifying the preform includes directing the densifying material through the conical conduit towards a center of the given voxel.

3. The method of claim 2, wherein heating the preform includes heating the preform before densifying the preform to pyrolize the composite material.

4. The method of claim 3, wherein:
    the composite material includes a carbon fiber coated in a carbon precursor resin; and
    heating the preform includes pyrolizing the composite material to leave behind the carbon fiber and less than 40% of the carbon precursor resin.

5. The method of claim 4, wherein heating the preform includes pyrolizing the composite material to leave behind the carbon fiber and less than 20% of the carbon precursor resin.

6. The method of claim 3, wherein:
    the composite material includes a ceramic fiber coated in a ceramic precursor resin; and
    heating the preform includes pyrolizing the composite material to leave behind the ceramic fiber and less than 40% of the ceramic precursor resin.

7. The method of claim 6, wherein heating the preform includes pyrolizing the composite material to leave behind the ceramic fiber and less than 20% of the ceramic precursor resin.

8. The method of claim 2, wherein heating the preform includes heating the preform after densifying the preform to pyrolize both the composite material and the densifying material.

9. The method of claim 2, wherein the densifying material is at least one of a liquid and a gas.

10. The method of claim 2, wherein densifying the preform includes densifying the material with a supply of the densifying material connected to the print head.

11. The method of claim 2, wherein heating the preform includes heating the preform with a heater connected to the print head.

12. The method of claim 2, further including exposing the composite material to at least partially cure the composite material prior to heating the preform.

13. The method of claim 12, wherein heating the preform includes placing the preform in an oven and ramping up a temperature of the oven to a pyrolizing temperature.

14. A method of additively manufacturing a composite structure, comprising:
    discharging a composite material from a print head;
    moving the print head during discharging to fabricate a preform from the composite material;
    densifying the preform with a densifying material;

heating the preform to pyrolize at least one of the composite material and the densifying material; and wherein:

the composite material includes a first continuous reinforcement and a continuous reinforcement that is different from the first continuous reinforcement, both the first continuous reinforcement and the second continuous reinforcement being coated in a composition;

heating the preform includes burning away the continuous first reinforcement to form continuous conduit in place of the at least one continuous reinforcement, wherein the continuous conduit extends to a given voxel of the composite structure; and densifying the preform includes directing the densifying material through the continuous conduit toward a center of the given voxel.

\* \* \* \* \*